Figure 1:
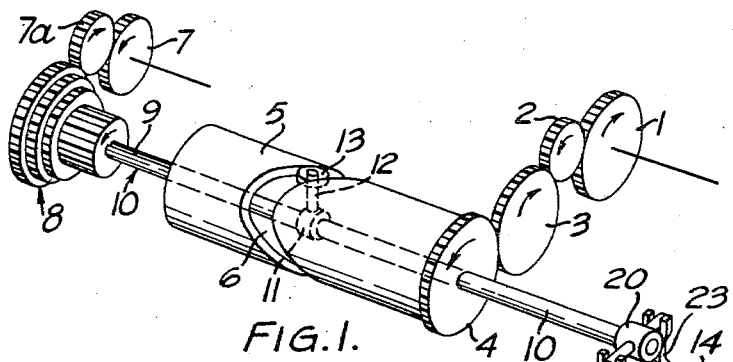

July 20, 1965 R. McGAVIN GARLAND ETAL 3,195,780
APPARATUS FOR DISPENSING PRESELECTED MIXTURES OF LIQUIDS
Filed Jan. 22, 1962 2 Sheets-Sheet 1

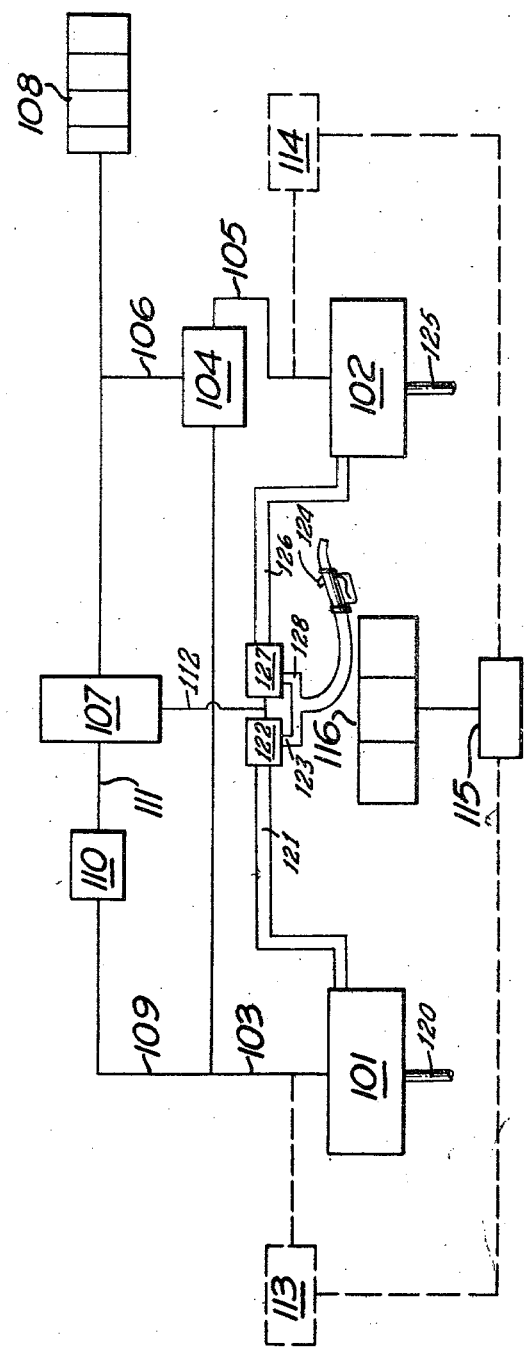

United States Patent Office 3,195,780
Patented July 20, 1965

3,195,780
APPARATUS FOR DISPENSING PRESELECTED MIXTURES OF LIQUIDS
Ronald McGavin Garland, Richmond, Surrey, and Ernest Stanley Ashford, Hurst Green, Oxted, Surrey, England, assignors, by mesne assignments, to Veeder-Root Incorporated, Hartford, Conn., a corporation of Connecticut
Filed Jan. 22, 1962, Ser. No. 167,882
Claims priority, application Great Britain, Jan. 23, 1961, 2,656/61
9 Claims. (Cl. 222—134)

This invention relates to apparatus for dispensing preselected mixtures of liquids and concerns more particularly apparatus for dispensing different mixtures of two liquids, such, for example, as petrols of different grades or octane ratings.

In a known type of such apparatus there are provided separate flow lines for the liquids, each flow line including a pump, an adjustable control valve, and a flow meter having an output shaft, with a common discharge nozzle for the flow lines. Also such apparatus has included a total cost indicator, a total quantity indicator, and two differential mechanisms. An output shaft of one of these differential mechanisms, driven by the output shafts of the flow meters, drives the total cost indicator, whilst an output shaft of the second of the differential mechanisms, also driven by the output shafts of the flow meters, drives the total quantity indicator, so that the total cost and quantity of the mixed liquids dispensed is indicated.

In such known type of apparatus, the output shaft of each of the flow meters is coupled to an output valve, an individual valve for each output shaft, and these output valves are coupled together so as to control the proportions of the two liquids delivered as a mixture to the discharge nozzle. Such an arrangement is not altogether satisfactory since the accuracy of the proportions of the two liquids in the dispensed mixture is dependent on the accuracy of the calibration and presetting of the valves; furthermore should there arise, through an unforeseen cause, any restriction or impediment to the flow of liquid to the valves, the valves will remain at the preselected position for delivering the desired proportions of liquids and thus an incorrect mixture would be delivered. To overcome the above disadvantages, it has been proposed to connect the output shafts of the flow meters to a mixture control valve differential mechanism through gear boxes, one gear box being provided for the output shaft of each flow meter, the gears of said gear boxes being selected so as to obtain identical speeds of drive to each side of said differential mechanism. Such an arrangement gives greater accuracy of control but provides a somewhat complicated and expensive device.

According to the present invention apparatus for dispensing preselected mixtures of two liquids of the type comprising a separate flow line for each liquid, each flow line including a pump, a flow meter having an output shaft, and an output control valve, and a common discharge nozzle for the two flow lines, is characterised in that the output shafts of the two flow meters are connected to a summing differential mechanism in which the speeds of rotation of the two output shafts are added, an output shaft of the summing differential mechanism driving a first part of a cam-operated valve control mechanism for actuating the output control valves controlling the flow of liquid to the discharge nozzle, one of said flow meters also driving a second part of said cam-operated valve control mechanism through a gear box.

In one arrangement, the first part of said cam-operated valve control mechanism may comprise a hollow casing carrying a cam track and rotatably driven by said summing differential mechanism through gearing, and said second part of the cam-operated valve control mechanism may comprise a shaft which is rotatably driven through said gear box by said flow meter, and which passes through and is slidably mounted within said hollow casing and carries a cam displaceable by said cam track to effect longitudinal movement of the valve control mechanism shaft in one or other axial direction when said shaft is rotatably driven, through said gear box, at a speed different from that of said hollow casing.

In such an arrangement, said valve control mechanism shaft may be coupled at one end to said gear box and at the other end may be rotatably mounted in a collar which is pivotally connected to a lever mounted for upward or downward movement according to the direction of longitudinal movement of said shaft, said lever being connected to said output valves for effecting operation thereof.

In an alternative arrangement, said first part of the cam-operated valve control mechanism may comprise a hollow casing carrying a cam track and rotatably driven by said summing differential through gearing, as in the first-mentioned arrangement, and said second part of the cam-operated valve control mechanism may also comprise a shaft which is rotatably driven through said gear box by the flow meter, but in this alternative arrangement said shaft may be restrained from axial movement, with the hollow casing slidably mounted on the shaft, said valve control mechanism shaft carrying a cam which is effective to cause displacement of said cam track and axial movement of said hollow casing over said shaft in one or other axial direction when said shaft is rotatably driven, through said gear box, at a speed different from that of said hollow casing.

In said alternative arrangement, said axially movable hollow casing may carry a co-axial sleeve extending therefrom and slidable on one end of said valve control mechanism shaft and coupled to means for actuating said output valves.

In both arrangements, the hollow casing is preferably a cylinder having said cam track formed in the wall thereof, and said cam is preferably a roller rotatably mounted on a collar fixed to said valve control mechanism shaft.

Figure 2:
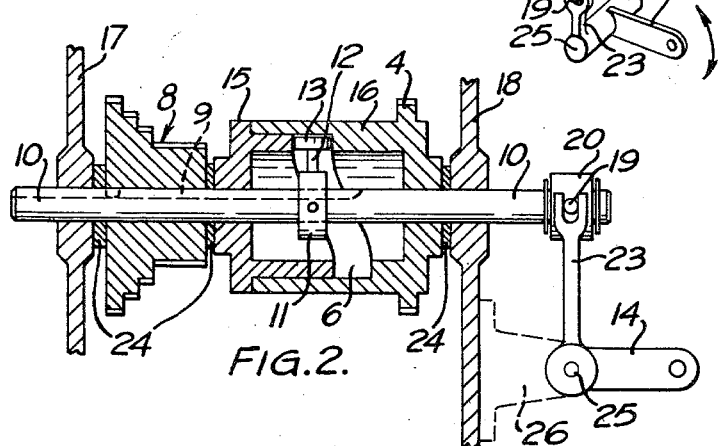
Figure 3:
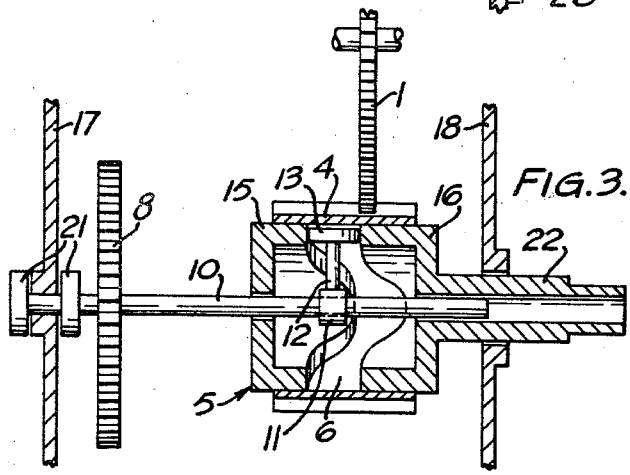

These two alternative arrangements of mechanism, according to this invention, are illustrated, by way of example, in the accompanying diagrammatic drawings in which FIGURES 1 and 2 show one of the arrangements of mechanism; and FIGURE 3 shows the alternative arrangement.

In the drawings:
FIGURE 1 is a general perspective view of the mechanism;
FIGURE 2 is a cross-sectional elevation of mechanism conforming to the arrangement shown in FIGURE 1;
FIGURE 3 is a cross-sectional elevation, similar to FIGURE 2 of the alternative arrangement of mechanism, and
FIG. 4 is a diagrammatic view showing the use of the mechanism in apparatus for dispensing preselected mixtures of liquids.

Referring to FIGURE 1, the summing differential mechanism and the output shaft of one of the flow meters is not shown, but the output shaft from the summing differential mechanism which will be rotated at a speed obtained by adding the speeds of rotation of the output shafts of the two flow meters, drives a gear wheel 1. This gear wheel 1 drives, through an idler wheel 2, a further gear wheel 3 which is in mesh with a gear wheel 4 so that the gear wheel 4 is driven in a direction which is opposite to that of gear wheel 1. Gear wheel 4 is secured to and forms part of a cam unit comprising a cylindrical cam casing, generally indicated at 5, which has a cam track 6 formed therein.

The output shaft from one flow meter only is drivingly connected to a gear wheel 7 which, through an idler wheel 7a drives a gear cluster, generally indicated at 8, which gear cluster forms part of a gear box of known construction in this type of apparatus. The idler wheel 7a is shown in mesh with the largest gear wheel of the gear cluster but, it is to be understood, that the gear box may be actuated in known manner to cause the idler gear wheel 7a to mesh with any one of the other gear wheels of the gear cluster.

The construction and operation of the gear box forms no part of the present invention and further description thereof appears to be unnecessary.

The gear cluster 8 is mounted upon one end of a shaft 10 to which it is secured by a key and a keyway 9 formed in the shaft so as to be rotatable with the shaft but allow the shaft to be slidable relative to the gear cluster 8, the shaft 10 forming a valve control mechanism shaft.

The cam unit includes a collar 11 which is fixedly secured to the shaft 10 and which mounts a short stud 12 which rotatably carries a roller 13, which roller is located in the cam track 6, as shown.

The cam track 6 is of such a shape, as shown, that as the gear cluster 8 is incapable of axial movement, and the gear wheel 4 on cylinder 5 is rotated, the cam roller 13 will be moved longitudinally by the cam track 6 first in one direction then in the other direction, i.e. to the right in the drawing and then to the left. This movement of the cam roller 13 will cause longitudinal sliding movement of the shaft 10 relative to the cylinder 5 and the gear cluster 8, and this longitudinal movement is utilised to control a lever 14 for movement in an upward or downward direction, as indicated by the double-headed arrow. Lever 14, in this movement, actuates the valves controlling the flow of liquid to the discharge nozzle.

Referring now to FIGURE 2, which shows this arrangement in greater detail, and also to FIGURE 1 when applicable, the cylindrical cam casing 5 is formed in two parts, indicated at 15 and 16, for ease of assembly of the collar 11 and its stud 12 and cam roller 13. The part 16 is secured to the part 15 so as to form the complete cylindrical casing after the collar 11 carrying the stud 12 has been fixed, by pinning, or other suitable means, to the shaft 10, and after the roller 13 has been mounted on the stud 12. The two parts 15 and 16 co-operate to form the cam track 6 inside the cylindrical casing as shown. The gear wheel 4 is formed integrally with the part 16 of the cylindrical casing, and the whole assembly of shaft 10, gear cluster 8, and the cam unit formed of the parts and elements 6, 11, 13, 15, 16 and the gear wheel 4, is mounted with the interposition of suitable washers 24 between frame members 17 and 18 of a casing in which the valve control mechanism is mounted.

As will be seen from the right-hand part of FIGURE 2, the shaft 10 passes completely through the end of part 16 of the cylindrical casing and through the frame member 18, and the end of the shaft 10 is rotatably mounted in a collar 20 which fixedly carries projecting arms 19 which engage in forked arms 23, only one of which is shown in FIGURE 2 but both of which are shown in FIGURE 1. These forked arms 23 are mounted on a cross-shaft 25 to which lever 14 is attached, cross-shaft 25 being rotatably mounted in a bracket 26 secured to the frame member 18.

It will be appreciated that, through the mechanism just described, whilst the shaft 10 is free to rotate in the collar 20, the lever 14 can be moved upwardly or downwardly according to the direction of longitudinal movement of the shaft 10. Thus, through such longitudinal movement of shaft 10 relative to the frame members 17 and 18, casing 5 and the gear cluster 8, there is attained actuation of the valves controlling the flow of liquid to the discharge nozzle whenever the shaft 10 is rotatably driven by gear wheel 7 through the gear cluster 8, at a speed which is different from that of the casing 5, this speed difference being between the speed of the output shaft of the summing differential and the speed of the output shaft of the flow meter driving gear wheel 7.

Referring now to the alternative arrangement of mechanism shown in FIGURE 3, in which like parts are given the same reference numerals as in FIGURES 1 and 2, the co-operating parts 15 and 16 of the cylindrical cam casing 5 carry the gear wheel 4, which is shown as having gear teeth extending in the longitudinal direction for a substantial length of the cylindrical cam casing. The gear wheel 4 is in mesh with the gear wheel 1 driven by the output shaft of the summing differential, and the extended teeth of the gear wheel 4 allow for relative sliding movement between the gear wheels 1 and 4 for the purpose to be hereinafter described.

The cylindrical cam casing 5 is provided with a cam track 6 and is free to slide on the shaft 10 between the frame members 17 and 18. In this form of mechanism, as in that shown in FIGURES 1 and 2, the shaft 10 carries the collar 11 mounting the stud 12 which rotatably carries the cam roller 13 which co-operates with the cam track 6. However, in this alternative arrangement of mechanism, the shaft 10 is shown driven by a single gear wheel 8, forming part of the gear cluster, shown in FIGURES 1 and 2 of the gear box of the mechanism, and the shaft 10 is shown restrained from axial movement by the collars 21 engaging on either side of the frame member 17. The part 16 of the cylindrical cam casing 5 is formed with an axially extending co-axial sleeve 22 which projects through the frame member 18 and is attached to the valve control mechanism for actuating the valves controlling the flow of liquid to the discharge nozzle.

It will be appreciated that, in this alternative mechanism, when the shaft 10 and cylindrical cam casing 5 are revolving at the same speed, the cam roller 13 will remain in the same position in the cam track 6, but any difference in speed will result in the roller 13 assuming a different angular position in the cam track. As however, the shaft 10 cannot move axially, such a re-positioning of the cam roller 13 in the cam track 6 will cause the cylindrical cam casing to slide axially along the shaft 10 whereby the sleeve 22 will actuate the valve control mechanism.

The provision of the cam-operated valve control mechanism, in accordance with this invention, has the advantage over an ordinary differential gear mechanism control in that in the latter arrangement the differential gear case remains stationary but the bevels of the differential gear constantly rotate thereby giving rise to lubrication problems and problems of wear. In the control arrangement of the present invention, however, the assembly including the gear cluster 8, shaft 10, collar 11 and cylindrical cam casing 5 would, under similar operational circumstances, rotate together whilst movement of the cam roller 13 in the cam track 6 would only occur during brief moments when a difference in output speeds exists between the gear wheel 4 and the gear cluster 8.

Again, when using a differential gear mechanism, some difficulty may be found to exist in maintaining an equal response in the movement of the valve control lever when varying the mixture of the liquids being dispensed, since the movement of the differential gear cage is dependent upon the output speed of the summing differential mechanism. The reaction of the valve, however, is dependent upon the rate at which the output speed from the one flow meter can catch up or slow down and this response is better when a large proportion of the liquid from the said one flow meter is used in the mixture rather than when a small proportion thereof is being used, and the gear ratio to speed up the said flow meter to match the mixture or speed of the summing differential is large.

Problems of response varying between mixtures can be overcome in the control arrangement of the present invention by modifying the cam track for a steep angle where rapid response is required and a slower rise where rapid response is not so necessary.

Again if a differential gear mechanism be used, it would be necessary to provide some form of safety device to permit the differential gear cage to rotate even when the valve has reached the limit of its travel; such a device might take the form of a slip clutch arrangement, which, however, is not very desirable. With the cam actuated valve control arrangement according to this invention, the cam roller 13 would move almost to the peak of the cam track in order to close a valve, and it is, therefore, a relatively simple matter to provide, for example, a spring between the shaft 10 and the collar 20 of the arrangement shown in FIGURES 1 and 2, so that if continued rotation should take place and cam roller 13 would move past the peak of the cam track and hence continued rotation would not damage the mechanism.

The cam-actuated valve control device as above described, is suitable, as previously stated, for incorporation in apparatus for dispensing preselected mixtures of liquids, as described in our Patent No. 3,141,572, issued July 21, 1964. This combination is diagrammatically illustrated in FIGURE 4, which is a block diagram and wherein the cam-actuated valve mechanism is indicated at 107. This apparatus comprises a "Low" and a "High" octane rating liquid meter 101 and 102 respectively. The output shaft 103 of the "Low" meter 101 is led to one side of a summing differential 104 whilst the output shaft 105 of the "High" meter 102 is led to the other side of said differential 104, the output shaft 106 of which drives one side of a cam-actuated valve control mechanism 107 and also a "mix" quantity indicator 108. The output shaft 103 has a branch 109 which drives a gearbox 110, the drive 111 of which is coupled to the opposite side of the cam-actuated valve control mechanism 107, the output shaft 112 of which operates the valves 122 and 127 controlling the flow of liquid to the single delivery nozzle 124. 113 and 114 represent cash variators of known construction coupled through a cash summing differential 115 actuating a total cash indicator 116. The flow line for the "Low" octane rating liquid includes inlet conduit 120 to meter 101, outlet conduit 121 from meter 101 to valve 122, and delivery line 123 to the delivery nozzle 124. The flow line for the "High" octane rating liquid includes inlet conduit 125 to meter 102, outlet conduit 126 from meter 102 to valve 127, and delivery line 128 to the nozzle 124.

What is claimed is:

1. Apparatus for dispensing preselected mixtures of two liquids comprising a separate flow line for each liquid and a common discharge nozzle in communication with said flow lines, each flow line including a flow meter and an output control valve for controlling the flow of liquid to said nozzle, each of said flow meters having an output shaft, a summing differential means connected to the flow meter output shafts for adding the speeds of rotation of said output shafts and having an output shaft, a cam-operated valve control means for actuating said output control valves in response to variations in rotary speed of the summing differential output shaft and one of said meter output shafts, said cam-operated valve control means including two relatively rotatable and relatively longitudinally movable parts, one of said parts being connected to said summing differential output shaft to be driven thereby and the other part being operatively connected to one of said meter output shafts to be driven thereby.

2. Apparatus for dispensing preselected mixtures of two liquids comprising a separate flow line for each liquid, a common discharge nozzle in communication with said flow lines, each flow line including a flow meter and an output control valve for controlling the flow of liquid to said nozzle, a summing differential connected to the flow meters for adding the speeds of rotation thereof and having an output shaft, a variable gear mechanism connected to one of the flow meters and having an output shaft, a valve control mechanism comprising a rotatable shaft connected for rotation by one of said output shafts, a hollow casing mounted for rotation on said axially movable shaft and having a cam track, said casing being connected for rotation by the other of said output shafts, said shaft and casing being relatively movable axially responsive to differences in speed of rotation thereof, and connecting means between the valves and the valve control mechanism for operating the valves responsive to relative longitudinal movement of the shaft and casing.

3. Apparatus for dispensing preselected mixtures of two liquids comprising a separate flow line for each liquid, a common discharge nozzle in communication with said flow lines, each flow line including a flow meter and an output control valve for controlling the flow of liquid to said nozzle, each of said flow meters having an output shaft, a summing differential connected to the flow meter output shafts for adding the speeds of rotation of said output shafts and having an output shaft, valve control mechanism comprising a rotatable and axially movable shaft driven by one of said meter output shafts and connected to said valves for actuation thereof, a hollow casing mounted for rotation on said axially movable shaft and having a cam track, said casing being driven by the summing differential output shaft, said axially movable shaft having a cam rotatable therewith and located in said cam track of said casing thereby causing longitudinal movement of the axially movable shaft for actuating said valves in response to different speeds of the summing differential and flow meter output shafts.

4. Apparatus according to claim 3 wherein said hollow casing is a cylinder having said cam track formed in the wall thereof and said cam is a roller.

5. Apparatus according to claim 3 wherein a gearbox is connected to one of the meter output shafts and the axially movable shaft is driven by the speed-change mechanism.

6. Apparatus for dispensing preselected mixtures of two liquids comprising a separate flow line for each liquid, a common discharge nozzle in communication with said flow lines, each flow line including a flow meter and an output control valve for controlling the flow of liquid to said nozzle, each of said flow meters having an output shaft, a summing differential connected to the flow meter output shafts for adding the speeds of rotation of said output shafts and having an output shaft, valve control mechanism comprising a rotatable shaft driven by one of said meter output shafts and having a cam projecting therefrom and rotatable therewith, a rotatable hollow casing mounted on said rotatable shaft and being longitudinally movable relative thereto for actuating said output control valves, said casing being driven by the summing differential output shaft and having a cam track receiving said cam thereby causing longitudinal movement of the casing for actuating said valves in response to different speeds of the summing differential and flow meter output shafts.

7. Apparatus according to claim 6 wherein said hollow casing is a cylinder having said cam track formed in the wall thereof and said cam is a roller.

8. Apparatus according to claim 6 wherein a gearbox is connected to one of the meter output shafts and the rotatable shaft is driven by the speed-change mechanism.

9. A valve control mechanism for use in liquid mixing and dispensing apparatus of the type having a pair of flow lines, each flow line having an output control valve and a flow meter, and a summing differential for adding the output of said meters, said valve control mechanism comprising a hollow rotatable casing having a circumferential cam track, said casing being connected to the summing differential to be driven thereby, a rotatable actuating shaft mounted for longitudinal movement through said casing and being connected to one of said flow meters to be driven thereby, said actuating shaft being connected to said control valves for actuation thereof and having a cam projecting therefrom and rotatable therewith, said cam being located in said cam track whereby a rotary speed differential between said casing and said actuating shaft wil be effective to move said actuating shaft longitudinally to thereby actuate said control valves.

References Cited by the Examiner

UNITED STATES PATENTS 1,961,350   6/34   Grumsky.

LOUIS J. DEMBO, *Primary Examiner.*